(12) United States Patent
Spielvogel et al.

(10) Patent No.: US 10,288,094 B2
(45) Date of Patent: May 14, 2019

(54) HYDROSTATIC DRIVE

(71) Applicant: Robert Bosch GmbH, Stuttgart (DE)

(72) Inventors: Carola Spielvogel, Empfingen (DE);
Michael Mast, Schemmerhofen (DE);
Olivier Krajka, Nufringen (DE); Paul Luis Hernandez Ladera, Elchingen (DE); Dietmar Bantle, Fluorn (DE)

(73) Assignee: Robert Bosch GmbH, Stuttgart (DE)

( * ) Notice: Subject to any disclaimer, the term of this patent is extended or adjusted under 35 U.S.C. 154(b) by 151 days.

(21) Appl. No.: 15/501,405

(22) PCT Filed: Jul. 21, 2015

(86) PCT No.: PCT/EP2015/066590
§ 371 (c)(1),
(2) Date: Feb. 2, 2017

(87) PCT Pub. No.: WO2016/020181
PCT Pub. Date: Feb. 11, 2016

(65) Prior Publication Data
US 2017/0234338 A1    Aug. 17, 2017

(30) Foreign Application Priority Data

Aug. 6, 2014 (DE) .................. 10 2014 215 567

(51) Int. Cl.
*F15B 21/00* (2006.01)
*F15B 21/14* (2006.01)
(Continued)

(52) U.S. Cl.
CPC ............ *F15B 21/14* (2013.01); *B60K 6/12* (2013.01); *E02F 9/2217* (2013.01);
(Continued)

(58) Field of Classification Search
CPC ..... E02F 9/2267; E02F 9/2275; E02F 9/2232; E02F 9/2289; F15B 21/14; F15B 1/024;
(Continued)

(56) References Cited

U.S. PATENT DOCUMENTS

| 3,384,027 | A |   | 5/1968 | Jennings et al. |
| 4,815,334 | A | * | 3/1989 | Lexen .................. B60K 5/08 |
|           |   |   |        | 475/1 |

(Continued)

FOREIGN PATENT DOCUMENTS

| DE | 20 2013 003 490 U1 | 7/2013 |
| WO | 2012125798 A1 | 9/2012 |

OTHER PUBLICATIONS

International Search Report corresponding to PCT Application No. PCT/EP2015/066590, dated Oct. 5, 2015 (German and English language document) (6 pages).

*Primary Examiner* — Mark A Laurenzi
*Assistant Examiner* — Shafiq Mian
(74) *Attorney, Agent, or Firm* — Maginot, Moore & Beck LLP

(57) ABSTRACT

A hydrostatic drive includes a diesel engine and a hydrostatic adjustable machine which supplies multiple consumers in normal operation as a pump. The machine has a pressure/flow regulator to which is communicated, according to the load-sensing principle, the highest load pressure of the consumers, in particular when the machine is operated as a pump. In order to realize a start/stop function of the diesel engine, a previously charged high-pressure reservoir supplies the hydrostatic machine, which then acts as a starter motor for the diesel engine. In order to switch from pump to starter motor, the hydro-machine is adjusted over zero. In order for this switch to take place quickly and reliably, the pressure/flow regulator is deactivated by means of a switching valve and the adjustment device is supplied with an (Continued)

adjustment pressure medium via the switching valve, which medium is taken from the high-pressure reservoir or from an auxiliary reservoir.

13 Claims, 3 Drawing Sheets

(51) Int. Cl.
    *F02N 7/08*     (2006.01)
    *F15B 1/02*     (2006.01)
    *F04B 1/20*     (2006.01)
    *F04B 49/22*     (2006.01)
    *E02F 9/22*     (2006.01)
    *F02N 7/06*     (2006.01)
    *F15B 1/033*     (2006.01)
    *F15B 11/16*     (2006.01)
    *B60K 6/12*     (2006.01)
    *F15B 1/027*     (2006.01)
    *E02F 9/20*     (2006.01)

(52) U.S. Cl.
CPC .......... *E02F 9/2232* (2013.01); *E02F 9/2246* (2013.01); *E02F 9/2267* (2013.01); *E02F 9/2275* (2013.01); *E02F 9/2292* (2013.01); *E02F 9/2296* (2013.01); *F02N 7/06* (2013.01); *F02N 7/08* (2013.01); *F04B 1/20* (2013.01); *F04B 49/22* (2013.01); *F15B 1/024* (2013.01); *F15B 1/033* (2013.01); *F15B 11/161* (2013.01); *B60K 2006/126* (2013.01); *E02F 9/2066* (2013.01); *F15B 1/027* (2013.01); *F15B 2211/20523* (2013.01); *F15B 2211/20546* (2013.01); *F15B 2211/20553* (2013.01); *F15B 2211/20561* (2013.01); *F15B 2211/20569* (2013.01); *F15B 2211/20576* (2013.01); *F15B 2211/212* (2013.01); *F15B 2211/3052* (2013.01); *F15B 2211/3053* (2013.01); *F15B 2211/55* (2013.01); *F15B 2211/6051* (2013.01); *F15B 2211/6054* (2013.01); *F15B 2211/6055* (2013.01); *F15B 2211/6057* (2013.01); *F15B 2211/625* (2013.01); *F15B 2211/653* (2013.01); *F15B 2211/71* (2013.01); *F15B 2211/781* (2013.01); *F15B 2211/88* (2013.01); *Y02T 10/6208* (2013.01)

(58) Field of Classification Search
CPC ...... F15B 1/033; F15B 11/161; F15B 11/003; F15B 11/024; F15B 11/0423
See application file for complete search history.

(56) References Cited

U.S. PATENT DOCUMENTS

| | | | | |
|---|---|---|---|---|
| 5,787,710 | A | * | 8/1998 | Baeuerle .............. F16D 48/066 192/12 C |
| 6,852,056 | B2 | * | 2/2005 | Weeramantry .......... F16H 47/04 475/73 |
| 8,220,256 | B2 | * | 7/2012 | Mueller .................. B60K 6/12 60/414 |
| 8,585,524 | B2 | * | 11/2013 | Mueller .................. B60K 6/12 475/72 |
| 8,968,135 | B2 | * | 3/2015 | Stephens ................ B60K 6/12 475/72 |
| 9,482,246 | B2 | * | 11/2016 | Geissler ................ B60K 11/00 |
| 2008/0276606 | A1 | * | 11/2008 | Petre ........................ B60K 6/12 60/413 |
| 2009/0241534 | A1 | * | 10/2009 | Tikkanen ................ B60K 6/12 60/413 |
| 2010/0069193 | A1 | * | 3/2010 | Mueller .................. B60K 6/12 475/78 |
| 2010/0293934 | A1 | * | 11/2010 | Mueller .................. B60K 6/12 60/413 |
| 2011/0302913 | A1 | * | 12/2011 | Mueller .................. B60K 6/12 60/413 |
| 2012/0060777 | A1 | * | 3/2012 | Tikkanen ................ F01P 7/044 123/41.11 |
| 2013/0098464 | A1 | * | 4/2013 | Knussman ............ E02F 9/2235 137/12 |

* cited by examiner

HYDROSTATIC DRIVE

This application is a 35 U.S.C. § 371 National Stage Application of PCT/EP2015/066590, filed on Jul. 21, 2015, which claims the benefit of priority to Serial No. DE 10 2014 215 567.3, filed on Aug. 6, 2014 in Germany, the disclosures of which are incorporated herein by reference in their entirety.

BACKGROUND

The disclosure relates to a hydrostatic drive which is provided in particular for starting an internal combustion engine, in particular a diesel engine.

The hydraulic machine of a hydrostatic drive of this type is driven as a pump by an internal combustion engine which is generally a diesel engine. In the mode as a pump, the volumetric flow of pressure medium is supplied, for example to a hydropneumatic high pressure accumulator, which is also called hydraulic accumulator for short, or to other hydraulic consumers. The drive can be arranged on a mobile working machine, such as, for example, an excavator, and the other hydraulic consumers can be, for example, a hydraulic steering system and various lifting cylinders.

Documents U.S. Pat. No. 3,384,027 and DE 20 2013 003 490 U1 show drives of this type, in which the hydraulic machine apart from supplying other hydraulic consumers, also charges a hydraulic accumulator. After a stoppage of the internal combustion engine, for the restarting thereof, the hydraulic machine is operated as a motor and is supplied with pressure medium from the hydraulic accumulator.

Aspects of fuel saving have become increasingly important in recent years, and therefore there are approaches for start-stop functions for the diesel engine. If the latter is not required, it is intended to be switched off, and when it is required again, it has to be restarted. This may take place comparatively frequently, with energy being required for each start.

Document WO 2012/125798 A1 shows a drive in which the internal combustion engine in the normal mode drives a hydraulic machine which is operated as a pump and which—in addition to supplying other hydraulic consumers—also charges the hydraulic accumulator. For restarting of the internal combustion engine, the pressure medium of the hydraulic accumulator is used in order to drive the hydraulic machine, which is then used as a starter motor. For a transitional period in this case, a consumer shut off valve in the pump line to the other consumers is closed so that the latter are not activated or moved in an uncontrolled manner.

A disadvantage of drives of this type is that, when the hydraulic machine is used as a starter motor, the throughflow direction has to be maintained so that the internal combustion engine is started again in the same predetermined direction of rotation at which it has previously operated. The connection which, in the normal mode, was the low pressure connection or intake connection of the hydraulic machine acting as a pump therefore, upon starting, has to form the high pressure side of the hydraulic machine acting as a motor. Accordingly, the drive from WO 2012/125798 A1 requires various selector valves, for which it has to be ensured that they are switched before the internal combustion engine can be started.

By contrast, the disclosure is based on the object of providing a hydrostatic drive for starting an internal combustion engine, in which the internal combustion engine can be started without a pressure side on the hydraulic machine having to be changed in comparison to the mode as a pump. The start-stop function is intended to be able to react rapidly and reliably here.

This object is achieved by a hydrostatic drive having the features of the disclosure.

Further advantageous refinements of the disclosure are described in the dependent claims.

SUMMARY

The hydrostatic drive has a hydraulic machine which is adjustable in its swept volume by means of a hydraulic adjustment device, is operable as a pump and as a motor, and in a mode as a motor, is provided for driving the internal combustion engine, with at least one high pressure accumulator from which the hydraulic machine is suppliable with pressure medium via a pump line, which runs between a working connection of the hydraulic machine and the high pressure accumulator, for the mode as a motor, and an accumulator shut off valve having a first position and a second position, which is arranged in the pump line and by means of which a fluidic connection from the high pressure accumulator to the hydraulic machine is open in the first position and is shut off in the second position. A start-stop function of the internal combustion engine is therefore realized. According to the disclosure, the hydraulic machine is adjustable by the adjustment device from a positive swept volume and pump mode via a zero position, in which the swept volume is zero, to a negative swept volume and motor mode. The mode as a pump and the mode as a motor are therefore in the same direction of rotation of the hydraulic machine, wherein the same working connection is in each case the pressure connection. During adjustability of this type, the hydraulic machine, if it is an axial piston machine, is also characterized as being fully pivotable. For an adjustment to a negative swept volume, the adjustment device is suppliable with pressure medium from a pressure medium source via a control valve independently of the working connection of the hydraulic machine.

In the case of a hydrostatic drive according to the disclosure, the adjustment to a negative swept volume and therefore the starting of the internal combustion engine can take place very rapidly since a corresponding inlet of the control valve can be permanently acted upon with pressure from the pressure medium source and, after the switching of the control valve, the adjustment device is acted upon directly with pressure. In particular, after switching of the control valve, the adjustment device can then be supplied with pressure medium even before the working connection of the hydraulic machine is connected to the high pressure accumulator, and therefore there is still no pressure at the working connection during the adjustment operation. The effect achieved by this is that only a very low torque, if any at all, is transmitted to the crankshaft of the internal combustion engine counter to the normal direction of rotation of the internal combustion engine. Since there is no high pressure at the working connection of the hydraulic machine during the adjustment operation, the mechanical friction in the adjustment system is low. This contributes to a high extent to the adjustment operation proceeding rapidly.

The adjustment device is preferably connectable to the high pressure accumulator via the control valve. The outlay in terms of device is therefore low. However, the pressure medium source may also be an auxiliary accumulator with a significantly lower pressure level than prevails in the high pressure accumulator, for example may be a hydraulic accumulator which is fed via the low pressure of a hydrostatic travel drive having a closed hydraulic circuit.

That the adjustment device, after switching of the control valve, can be supplied with pressure medium even before the working connection of the hydraulic machine is connected to the high pressure accumulator can be achieved in a simple manner in that, during an adjustment to a negative swept volume, first of all the adjustment device is acted upon with actuating pressure via the control valve and the accumulator shut off valve is brought into its first position with a time delay. In a particularly preferred refinement, the control valve is a seat valve with an inlet which is fluidically connected to the pressure medium source, and with an actuating pressure outlet which is connected to an actuating pressure inlet of the adjustment device. The control valve can take up a first position in which the inlet is shut off in an at least approximately leakage-free manner, and a second position in which the inlet is fluidically connected to the actuating pressure outlet. Pressure can therefore be permanently present at the inlet of the control valve without leakage occurring to a significant extent and therefore energy being lost.

The high pressure accumulator is advantageously superchargeable by the hydraulic machine in the mode as a pump.

In order, in the mode as a pump, to be able to change the delivery flow for charging the high pressure accumulator or for supplying other hydraulic consumers in accordance with certain criteria, the hydraulic machine is customarily assigned a hydraulic regulating device with an actuating pressure outlet. The control valve is then advantageously a 3/2-way valve with a first inlet which is fluidically connected to the actuating pressure outlet of the hydraulic regulating device, with a second inlet which is fluidically connected to the pressure medium source, and with an outlet which is connected to an actuating pressure inlet of the adjustment device. The control valve has a first position, in which the outlet is fluidically connected to the first inlet and the second inlet is shut off, and a second position in which the outlet is connected to the second inlet and the first inlet is shut off. The regulating device is therefore effective in the first position of the control valve and is ineffective in the second position of the control valve.

The regulating device is in particular a load-sensing regulating valve which is acted upon by the pump pressure, with the effect of a pressure medium inflow to the actuating pressure chamber of the adjustment device, and is acted upon by a spring and an LS pressure, which is present at an LS connection (X), with the effect of a pressure medium outflow from the actuating pressure chamber. In the case of a load-sensing regulation, LS regulation for short, depending on a highest load pressure of at least one hydraulic consumer, said load pressure acting in a common LS indicator line, such a delivery volume flow is delivered by a hydrostatic hydraulic machine, which is operated as a pump, that a pump pressure lying above the highest load pressure by a certain difference in pressure, which is also called pump delta-p (pump $\Delta p$), is set in the pump line. In this respect, an LS regulation is actually a regulation of the difference in pressure which, however, together with a metering orifice via which the delivery volume flow flows, becomes a delivery flow regulation. The LS indicator line is connected to an LS connection of the load-sensing regulating valve, also called LS regulator for short. The load-sensing regulating valve, which is also referred to as the delivery flow regulating valve, also delivery flow regulator for short, is usually combined with a pressure regulating valve at which a maximum pump pressure is set. The combination of LS regulating valve or delivery flow regulating valve and pressure regulating valve is also referred to as the pressure delivery flow regulator.

An adjustable pressure limiting valve (62) is preferably connected to the LS connection (X) between the latter and a nozzle (64). With said pressure limiting valve, the pump pressure can therefore be continuously ramped up during the charging of the high pressure accumulator and therefore the charging speed can be predetermined. A reduced LS pressure can therefore also be derived from the pressure of the pump line and indicated to the LS connection. Said reduced LS pressure may also be lower than customary load pressures of the other consumers. The adjustment device or the LS regulating valve can therefore be influenced during the charging of the accumulator in such a manner that the swept volume of the hydraulic machine is at least temporarily reduced in relation to its maximum value.

In the mode as a pump, the hydraulic machine can be used for the pressure medium supply of other hydraulic consumers, for example for hydrostatic steering system and/or working hydraulics of an excavator. In an energy-saving development of the drive according to the disclosure, said drive has a load-sensing system in which the pump pressure is regulable depending on a highest load pressure of at least one other hydraulic consumer, said load pressure acting in a common LS indicator line. Increasing load pressure brings about an increasing delivery volume flow, for which purpose the LS indicator line is preferably connected to an LS connection of the regulator or directly to the adjustment device. The pump line is connectable to the LS indicator line via an LS valve or directly to the LS connection. An LS pressure which differs from the highest load pressure of the at least one other consumer can therefore be set at the LS connection.

During the supply of a different consumer, passive supercharging of the high pressure accumulator up to the highest load pressure, which occurs during the operation, of the consumers is possible, wherein the maximum value of the highest load pressure can be determined by a pressure limiting valve which is assigned to the consumers. However, the high pressure accumulator is intended to be supercharged to a higher level for a following starting operation than this maximum value of the highest load pressure. Therefore, active supercharging of the high pressure accumulator always precedes the internal combustion engine being switched off.

By indication of the pump pressure or of an LS pressure which is reduced in relation to the pump pressure, but lies above the maximum possible highest load pressure of the other hydraulic consumers, the high pressure accumulator can be actively charged via the highest pump pressure, which occurs in the previous working cycle and up to which the passive supercharging is possible, and via the maximum possible highest load pressure before the internal combustion engine is switched off. By transmission of the pressure of the pump line via the LS valve to the IS connection, a hydraulic short circuit can be produced. The pump then sets its maximum delivery volume flow. If the hydraulic machine here is an axial piston machine, its adjustment device sets a maximum pivoting angle. During the charging of the accumulator, the pressure of the pump line is equal to the accumulator pressure thereof if another orifice is not provided between the hydraulic machine and the high pressure accumulator.

In a preferred refinement, the LS valve is a switching valve which, in a basic position pretensioned by a spring, shuts off the pump line to the LS indicator line or to the LS connection, and which, in a switching position—switched, for example, by an electromagnetic actuator—connects the pump line to the LS indicator line or to the LS connection. Therefore, in the basic position of the LS valve, the normal operation of the drive according to the disclosure is realized, in which the highest load pressure of the at least one consumer serves for the conventional regulation of the hydraulic machine operated as a pump, whereas, in the switching position of the LS valve, the accumulator can be charged so that the pressure medium thereof is available for the next starting of the internal combustion engine or for the next rapid adjustment.

In a preferred development, a first shuttle valve is arranged in the LS indicator line, at the first inlet of which shuttle valve the highest load pressure of the at least one consumer is present, and to the second inlet of which shuttle valve the LS valve is connected. The highest load pressure indicated by the consumers or the pump line pressure, which is indicated via the LS valve, if such pressure is higher, is therefore always present at an outlet of the first shuttle valve.

The blocking position of the accumulator shut off valve preferably has a nonreturn function, the passage direction of which is directed from the pump line to the high pressure accumulator. Alternatively, a nonreturn valve, the passage direction of which is directed from the pump line to the high pressure accumulator, can also be provided parallel to the accumulator shut off valve. The accumulator can therefore be passively recharged and remains at the highest pump pressure reached during the operation of the other hydraulic consumers.

In a preferred development, a consumer shut off valve is provided in the pump line. The at least one consumer can therefore be shut off and in particular separated from the hydraulic machine when the internal combustion engine is started or the high pressure accumulator is actively charged.

In a particularly preferred application of the drive according to the disclosure, the latter is provided in a mobile working machine. One of the consumers may be a steering system of the mobile working machine. An outlet of a second shuttle valve is then connected to the LS indicator line, to the first inlet of which shuttle valve an LS indicator line of the steering system is connected, and to the second inlet of which shuttle valve an LS indicator line of the remaining consumers is connected. The outlet of the second shuttle valve is connected to the first inlet of the first shuttle valve via the LS indicator line.

If the mobile working machine has a hydrostatic travel drive and the adjustment device of the hydraulic machine is connectable, according to the disclosure, to the auxiliary hydraulic accumulator, it is particularly preferred if the latter is fed by a feed pressure means of the travel drive.

A plurality of exemplary embodiments of a hydrostatic drive according to the disclosure are illustrated in the drawings. The disclosure is now explained in more detail with reference to the figures of said drawings.

DETAILED DESCRIPTION

Figure 1:
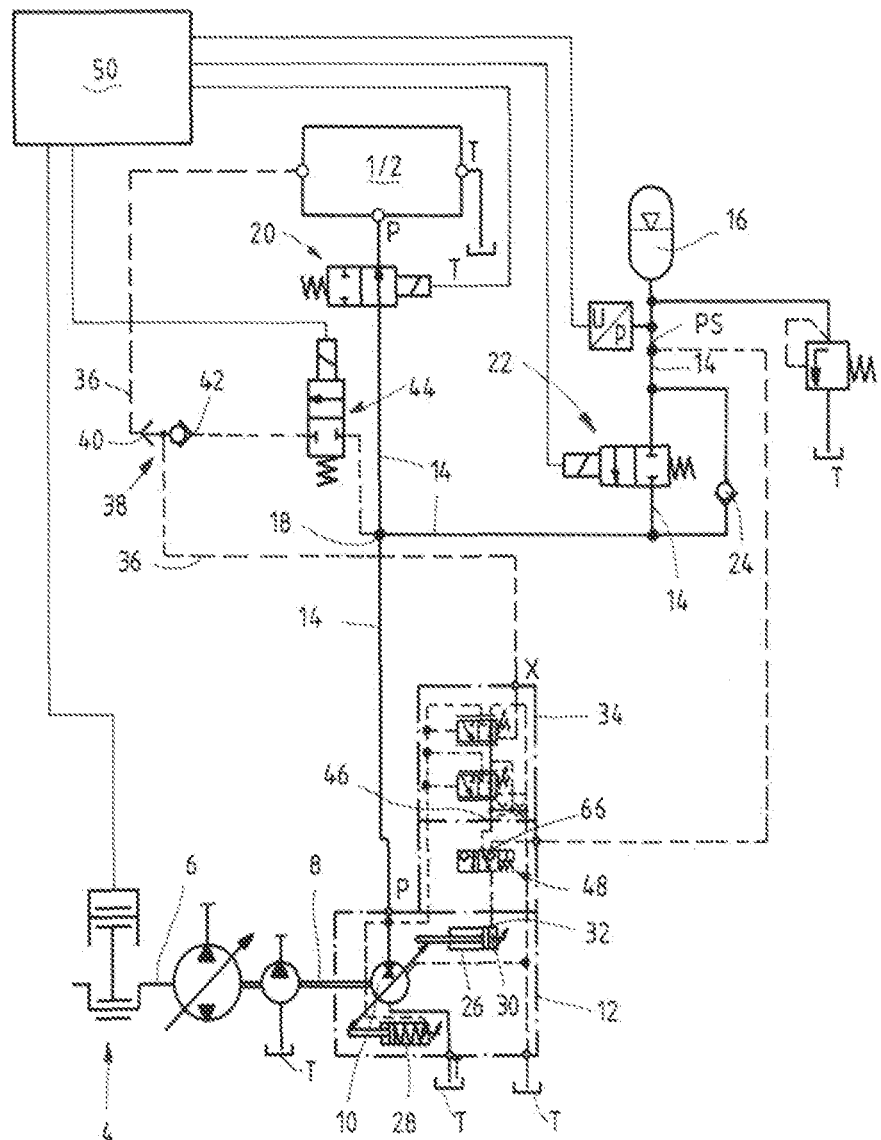
FIG. 1 shows a circuit diagram of a first exemplary embodiment.

FIG. 1 shows a circuit diagram of the first exemplary embodiment which, apart from starting a diesel engine, is also provided for steering and for actuating an item of equipment on a mobile working machine and, for this purpose, comprises a hydrostatic steering system 1 and further hydraulic consumers 2. The drive is used in combination with a diesel engine 4, the crankshaft 6 of which can be coupled to a drive shaft 8 of a hydraulic machine 10 which is adjustable via a zero position and is designed as a fully pivotable axial piston machine. The housing 12 of said hydraulic machine has a tank connection T and a pump connection P for the main volume flow of the hydraulic machine 10, wherein said two connections T, P are permanently and unambiguously assigned high pressure and tank pressure.

The pump connection P is connected to the steering system 1 and to the further consumers 2 and to a high pressure accumulator 16 via a branched pump line 14, which can also be referred to more generally as the working line. For this purpose, the pump line 14 has a branch 18. A consumer shut off valve 20 which is designed as a 2/2-way switching valve is provided between the branch 18, on the one hand, and the steering system 1 and the further consumers 2, on the other hand. In a blocking position pretensioned by a spring, said consumer shut off valve separates the steering system 1 and the further consumers 2 from the hydraulic machine 10 and the high pressure accumulator 16, while it opens the pump line 14 in a switching position.

Provided in the pump line 14 between the branch 18 and the high pressure accumulator 16 is an accumulator shut off valve 22 which, in a basic position pretensioned by a spring, shuts off the accumulator 16 in relation to the branch 18 and the hydraulic machine 10, and which opens the pump line 14 in a switching position.

The hydraulic machine 10 is designed as a fully pivotable axial piston machine. For this purpose, it has an adjustment device which essentially has an actuating cylinder 26 which acts counter to a mating cylinder 28 and a spring and the actuating pressure chamber 30 of which can be filled via an actuating pressure inlet 32. When the hydraulic machine is at a standstill, the pressures in the adjustment device and at the high pressure connection of the hydraulic machine dissipate relatively rapidly because of leakage, and therefore the hydraulic machine is set by the spring to a maximum positive swept volume. During filling of the actuating pressure chamber 30, the hydraulic machine 10 is pivoted back, as a result of which its swept volume is reduced. During more substantial filling of the actuating pressure chamber 30, the hydraulic machine 10 is pivoted through zero and fully pivoted when configured as an axial piston machine. The displacement volume of the hydraulic machine 10, which is now operable as a starter motor for the diesel engine 4, is then increased.

The actuating pressure chamber 30 can be filled—in the manner known in principle from the prior art—via a pressure delivery flow regulator 34 which has a load-sensing regulating valve which is acted upon by the pump pressure, with the effect of a pressure medium inflow to the actuating pressure chamber 30 of the adjustment device (26) and by a spring and an LS pressure, which is the highest load pressure of the consumers 1, 2 that is indicated at the LS connection X or is a predetermined control pressure, with the effect of a pressure medium outflow from the actuating pressure chamber 30. The pressure equivalent of the spring determines the difference in pressure by which the pump pressure lies above the LS pressure. The highest load pressure of the consumers 1, 2 is tapped off via a cascade of shuttle valves (not shown in FIG. 1) and transmitted to the LS connection X via a common LS indicator line 36.

A shuttle valve 38 is arranged in the LS indicator line 36, at the first inlet 40 of which shuttle valve the highest load pressure of the consumers 1, 2 is present and to the second inlet 42 of which shuttle valve the pump line 14 is connectable via an LS valve 44. In a basic position pretensioned by a spring, said LS valve shuts off the pump line 14 to the LS indicator line 36. In a switching position of the LS valve 44, the pressure of the pump line 14 is indicated to the shuttle valve 38 and, if said pressure is higher than the highest load pressure of the consumers 1, 2, is indicated to the LS connection X of the pressure delivery flow regulator 34. A hydraulic short circuit can therefore be produced and the pressure delivery flow regulator 34 discharges pressure medium from the actuating pressure chamber 30, as a result of which the delivery volume flow of the hydraulic machine 10 acting as a pump is increased. The high pressure accumulator 16 can therefore be charged.

Provided between an actuating pressure outlet 46 of the pressure delivery flow regulator 34 and the actuating pressure inlet 32 of the actuating cylinder 26 is a 3/2-way switching valve 48 via which the pressure delivery flow regulator 34 can be circumvented and instead the pressure medium thereof can be supplied from the high pressure accumulator 16 to the actuating pressure inlet 32. For this purpose, the 3/2-way valve 48 has a first inlet 66 which is connected to a portion of the pump line 14 that connects the accumulator shut off valve 22 to the high pressure accumulator 16. A second inlet of the 3/2-way valve 48 is connected to the actuating pressure outlet 46 of the pressure delivery flow regulator 34. An actuating pressure outlet of the 3/2-way valve 48 is connected to the actuating pressure inlet 32 of the actuating cylinder 26.

In a spring-pretensioned basic position of the 3/2-way valve 48, the pressure delivery flow regulator 34 is connected to the actuating pressure inlet 32 via the 3/2-way valve 48, and therefore the pressure delivery flow regulator 34 can implement the regulation of the hydraulic machine 10—in the manner known from the prior art. By switching over, brought about by an attracting solenoid, of the 3/2-way valve 48 into its switching position, the high pressure accumulator 16 is connected to the actuating pressure inlet 32, and therefore the hydraulic machine 10 is rapidly adjusted over the zero position and is subsequently available as a starter motor for the diesel engine 4.

An electronic control unit 50 which monitors the start-stop function of the drive shown is shown in the first exemplary embodiment according to FIG. 1. For example, when the stopped diesel engine 4 is restarted via the control unit 50, first of all the consumer shut off valve 20 is closed, and therefore the consumers 1, 2 are not moved unintentionally. Furthermore, the 3/2-way valve 48 is switched, and therefore the hydraulic machine 10 is rapidly adjusted from its position with a maximum positive swept volume over the zero position. Only then is the accumulator shut off valve 22 opened such that the pressure medium can flow from the charged high pressure accumulator 16 via the pump line 14 to the pump connection P of the hydraulic machine 10 and supplies the latter with pressure medium. Via the hydraulic machine 10 acting as a starter motor, the diesel engine 4 can be started with a correct direction of rotation without high connection and tank connection on the hydraulic machine having been mixed up.

An electronic control unit 50 which monitors the start-stop function of the drive shown is shown in the first exemplary embodiment according to FIG. 1. For example, when the stopped diesel engine 4 is restarted via the control unit 50, first of all the consumer shut off valve 20 is closed such that the consumers 1, 2 are not unintentionally moved. Furthermore, the 3/2-way valve 48 according to the disclosure is switched, and therefore the hydraulic machine 10 is rapidly adjusted over zero. The accumulator shut off valve 22 is then opened, and therefore the pressure medium can flow out of the charged high pressure accumulator 16 via the pump line 14 to the pump connection P of the hydraulic machine 10 and supplies the latter with pressure medium. Via the hydraulic machine 10 acting as a starter motor, the diesel engine 4 can be started in the direction in which it was previously operated.

After the diesel engine 4 has been started, in addition to the supply of the consumers 1, 2, the high pressure accumulator 16 can also be recharged via the nonreturn valve 24. The accumulator shut off valve 22 is closed here. During the supply of the consumers 1, 2, the high pressure accumulator 16 can be supercharged up to the highest achieved load pressure of the consumers, wherein the maximum value of the highest load pressure can be determined by a pressure limiting valve which is assigned to the consumers 1, 2. However, the high pressure accumulator is intended to be supercharged to a higher level for a following starting operation than said maximum value of the highest load pressure. Therefore, active supercharging of the high pressure accumulator always precedes the internal combustion engine being switched off. For this purpose, the consumer shut off valve 20 is closed and the LS valve 44 is switched and therefore opened, and therefore the pump pressure or accumulator pressure prevailing at the branch 18 is indicated to the LS connection X of the pressure delivery flow regulator 34 via the first shuttle valve 38. The pump then pivots to a maximum positive swept volume and therefore supercharges the high pressure accumulator to the desired, pressure. If the accumulator pressure which is detected by a pressure sensor has reached the desired value, the LS valve 44 is closed.

Figure 2:
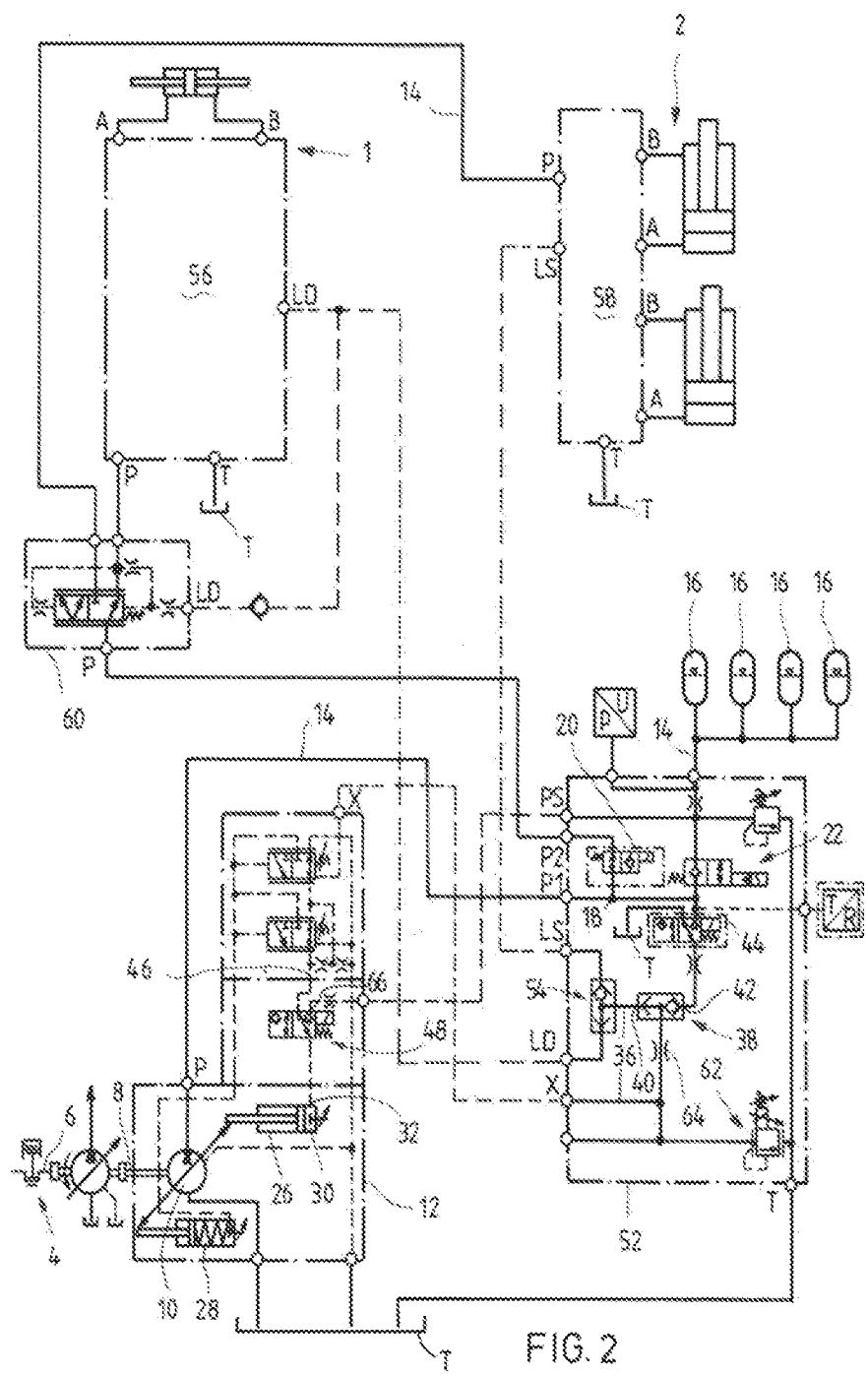
FIG. 2 shows a circuit diagram of a second exemplary embodiment.

FIG. 2 shows a second exemplary embodiment of a hydrostatic drive according to the disclosure. The essential difference with respect to the first exemplary embodiment according to FIG. 1 can be seen in the fact that a start-stop valve block 52 is formed in which the consumer shut off valve 20, with which a connection between two connections P1 and P2 of the start-stop valve block 52 can be made and interrupted, the accumulator shut off valve 22, the LS valve 44 and the first shuttle valve 38 are arranged. Furthermore, a second shuttle valve 54 is accommodated in the start-stop valve block 52, said second shuttle valve being connected firstly to an LS indicator line of the steering system 1 and secondly to an LS indicator line of the other consumers 2. In more precise terms, an LD connection LD of a valve block 56 of the steering system 1 and an LS connection LS of a valve block 58 of the other consumers 2 are connected to the second shuttle valve 54 in such a manner that the higher load pressure is indicated to the first inlet 40 of the first shuttle valve 38.

The two valve blocks 56, 58 furthermore have a pump connection P and a tank connection T. The pump line 14 branches via a priority valve 60 to the two pump connections P of the two valve blocks 56, 58, as a result of which the steering system 1 is favored in the event of a deficient supply.

Furthermore, in a departure from the first exemplary embodiment according to FIG. 1, four high pressure accumulators 16 switched parallel to one another are shown in the second exemplary embodiment according to FIG. 2, in order thereby to provide a particularly large pressure medium store and energy store for starting the diesel engine 4. For the active supercharging of the hydraulic accumulators 16, the consumer shut off valve is again closed. An LS pressure which is transmitted to the LS connection X of the pressure delivery flow regulator 34 is produced at the LS connection X of the start-stop valve block 52. For this purpose, the pump pressure transmitted to the outlet of the first shuttle valve 38 is reduced with the aid of a nozzle 64 and a proportionally adjustable pressure limiting valve 62 before the pressure is transmitted to the LS connections X of the start-stop valve block 52 and of the pressure delivery flow regulator 34. The nozzle 62 is arranged in a line portion between the outlet of the first shuttle valve 38 and the pressure limiting valve 62. The pressure limiting valve 62 is adjusted to ever higher pressures during the charging. The pump pressure is in each case higher by the pump Δp. In this manner, the speed of the charging operation and the maximum accumulator pressure can therefore be predetermined.

The LS valve 44 of the second exemplary embodiment according to FIG. 2 is designed as a 3/2-way valve and, in the basic position shown, which said valve takes up under the action of a spring, provides relief of the second inlet 42 of the first shuttle valve 38 to the tank T. A nozzle is arranged between the second inlet of the first shuttle valve 38 and the LS valve 44. Said nozzle can also be omitted.

By integration of the consumer shut off valve 20 in the start-stop valve block 52, the latter has two pump connections P, of which one is assigned to the hydraulic machine 10 and the other to the consumers 1, 2. Two lifting cylinders are shown as examples of further consumers 2.

In a departure from the first exemplary embodiment according to FIG. 1, the nonreturn function, which is used for recharging the high pressure accumulator 16 even when the accumulator shut off valve 22 is closed, is integrated in the accumulator valve 22.

Figure 3:
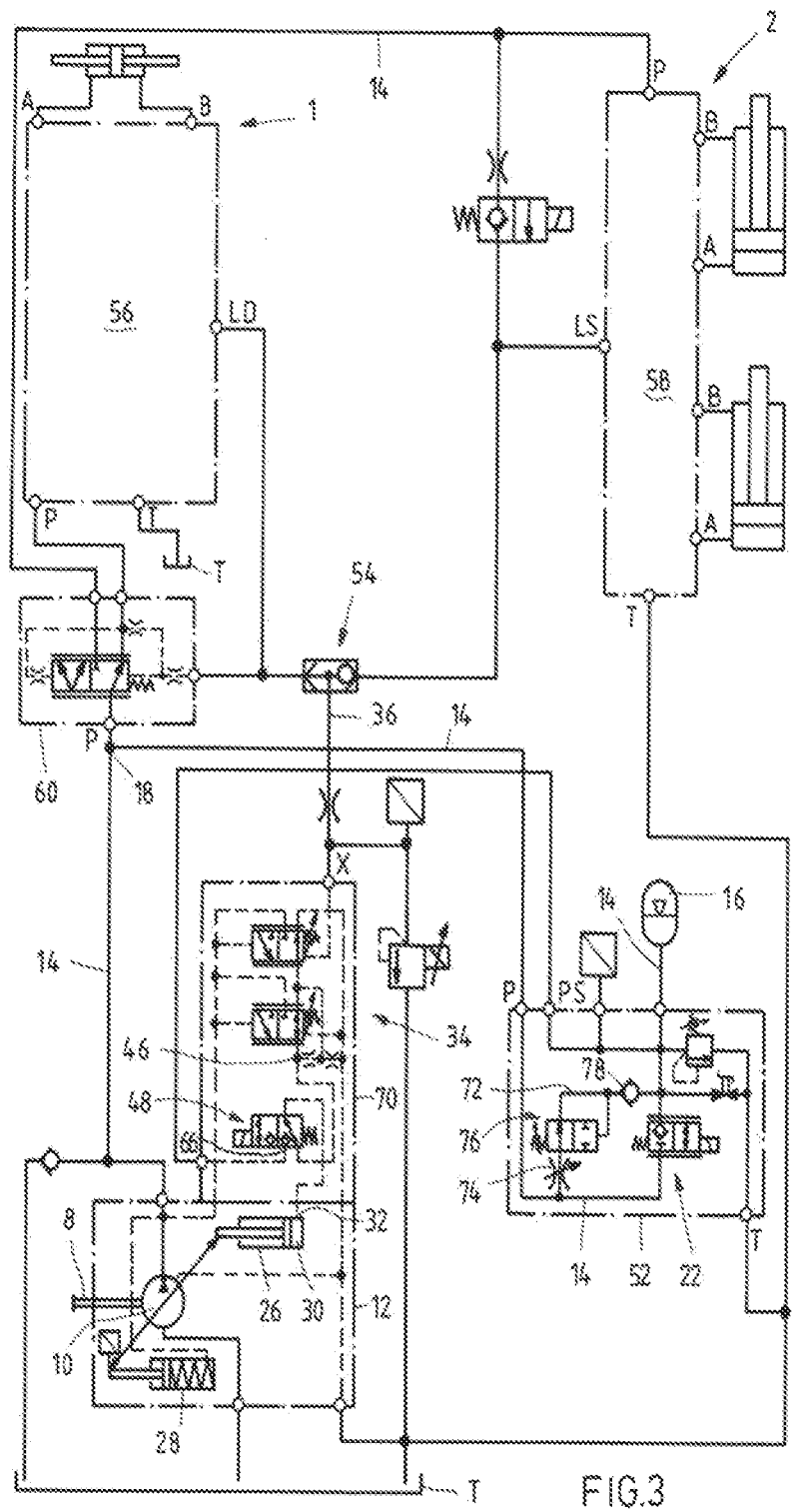
FIG. 3 shows a detail of a circuit diagram of a third exemplary embodiment.

FIG. 3 shows a third exemplary embodiment of a hydrostatic drive according to the disclosure, wherein the pressure delivery flow regulator 34 and the 3/2-way valve 48 are accommodated in a common housing 70 which is fitted on the housing 12 of the hydraulic machine 10 and, at the interface, forms the two connections for the pump pressure and for the actuating pressure medium. Furthermore, the common housing 70 of the pressure delivery flow regulator 34 and of the 3/2-way valve 48 has the LS connection X and the first inlet 66 described. In a departure from the first two exemplary embodiments according to FIGS. 1 and 2, the actuator of the 3/2-way valve 48 is arranged on the valve body opposite the spring and therefore said actuator is designed as a repelling solenoid.

The start-stop valve block 52 comprises the accumulator shut off valve 22 which is designed as a continuously adjustable seat valve and forms a block in its inoperative position. An adjustable throttle 74, a pressure reducing valve 76 and a nonreturn valve 78 opening from the pressure reducing valve 76 to the high pressure accumulator 16 are arranged in a parallel line 72 parallel to the accumulator shut off valve 22. Passive and active supercharging of the high pressure accumulator up to a highest value, which is predetermined by the adjustment of the pressure reducing valve 76, is possible via the throttle 74, the pressure reducing valve 76 and the nonreturn valve 78.

The continuous adjustability of the accumulator shut off valve affords the advantage that the volumetric flow flowing to the hydraulic machine 10 from the high pressure accumulator 16 are increased in a ramp-like manner starting from the closed valve. The effect which can be achieved by this is that the pressure rise in the pump line and at the hydraulic machine does not become too steep and the valves are not overloaded by an initially excessively high volume flow.

A hydrostatic drive is disclosed which is provided in particular for starting an internal combustion engine, and which is provided with a hydraulic machine which is adjustable in its swept volume by means of a hydraulic adjustment device, is operable as a pump and as a motor, and in a mode as a motor, is provided for driving the internal combustion engine, with at least one high pressure accumulator from which the hydraulic machine is suppliable with pressure medium via a pump line, which runs between a working connection of the hydraulic machine and the high pressure accumulator for the mode as a motor, and with an accumulator shut off valve having a first position and a second position, which is arranged in the pump line and by means of which a fluidic connection from the high pressure accumulator to the hydraulic machine is open in the first position and is shut off in the second position. In order to ensure rapid and reliable starting of the internal combustion engine without a great outlay, the hydraulic machine is adjustable by the adjustment device from a positive swept volume and pump mode via a zero position, in which the swept volume is zero, to a negative swept volume and motor mode. For an adjustment to a negative swept volume, the adjustment device is suppliable with pressure medium from a pressure medium source via a control valve independently of the working connection of the hydraulic machine.

LIST OF DESIGNATIONS

1 Steering hydraulics
2 Other consumers
4 Diesel engine
6 Crankshaft
8 Drive shaft
10 Hydraulic machine
12 Housing
14 Pump line
16 High pressure accumulator
18 Branch
20 Consumer shut off valve
22 Accumulator shut off valve
24 Nonreturn valve
26 Actuating cylinder
28 Mating cylinder
30 Actuating pressure chamber
32 Actuating pressure inlet
34 Pressure delivery flow regulator
36 LS indicator line
38 First shuttle valve
40 First inlet
42 Second inlet
44 LS valve
46 Actuating pressure outlet
48 3/2-way valve
50 Electronic control unit
52 Start-stop valve block
54 Second shuttle valve
56, 58 Valve block
60 Priority valve
62 Adjustable pressure limiting valve
64 Nozzle
66 Inlet of 48
70 Housing
72 Parallel line 74 Adjustable throttle
76 Pressure reducing valve
78 Nonreturn valve
A, B Working connection
LD LD connection
LS LS connection
T Tank, tank connection
P Pump connection
PS Control pressure outlet
X LS connection

The invention claimed is:

1. A hydrostatic drive for starting an internal combustion engine, comprising:
    a hydraulic machine with a swept volume, the hydraulic machine is (i) adjustable in the swept volume by a hydraulic adjustment device, (ii) operable as a pump and as a motor, and (iii) configured to drive the internal combustion engine in a mode as a motor;
    at least one high pressure accumulator from which the hydraulic machine is suppliable with pressure medium via a pump line when the hydraulic machine is being operated as a motor, the pump line running between a working connection of the hydraulic machine and the high pressure accumulator; and
    an accumulator shut off valve having a first position and a second position, the accumulator shut off valve is arranged in the pump line such that a fluidic connection from the high pressure accumulator to the hydraulic machine is open in the first position and is shut off in the second position,
    wherein the hydraulic machine is adjustable by the adjustment device from a positive swept volume and pump mode via a zero position, in which the swept volume is zero, to a negative swept volume and motor mode, and
    wherein, for an adjustment to a negative swept volume, the adjustment device is suppliable with pressure medium from a pressure medium source via a control valve independently of the working connection of the hydraulic machine.

2. The hydrostatic drive as claimed in claim 1, wherein, for an adjustment to a negative swept volume, the adjustment device is suppliable with pressure medium from the high pressure accumulator via the control valve.

3. The hydrostatic drive as claimed in claim 1, wherein the pressure medium source is the at least one high pressure accumulator, such that for an adjustment to a negative swept volume, the adjustment device is suppliable with pressure medium from the at least one high pressure accumulator via the control valve.

4. The hydrostatic drive as claimed in claim 1, wherein, during an adjustment to a negative swept volume, the adjustment device is acted upon with actuating pressure via the control valve prior to supplying the working connection of the hydraulic machine with pressure medium from the high pressure accumulator when the hydraulic machine is adjusted to a negative swept volume.

5. The hydrostatic drive as claimed in claim 4, wherein, during the adjustment to a negative swept volume, the working connection of the hydraulic machine supplied with pressure medium from the high pressure accumulator by bringing the accumulator shut off valve into its first position with a time delay.

6. The hydrostatic drive as claimed in claim 1, wherein the control valve is a seat valve with an inlet that is fluidically connected to the pressure medium source, and with an actuating pressure outlet that is connected to an actuating pressure inlet of the adjustment device, and wherein the control valve has a first position in which the inlet is shut off in an at least approximately leakage-free manner, and a second position in which the inlet is fluidically connected to the actuating pressure outlet.

7. The hydrostatic drive as claimed in claim 1, wherein the high pressure accumulator is superchargeable by the hydraulic machine in the mode as a pump.

8. The hydrostatic drive as claimed in claim 1, wherein:
    for the mode as a pump, the hydraulic machine is assigned a hydraulic regulating device with an actuating pressure outlet,
    the control valve is a 3/2-way valve with a first inlet that is fluidically connected to the actuating pressure outlet of the hydraulic regulating device, with a second inlet that is fluidically connected to the pressure medium source, and with an outlet that is connected to an actuating pressure inlet of the adjustment device, and
    the control valve has a first position, in which the outlet is fluidically connected to the first inlet and the second inlet is shut off, and a second position in which the outlet is connected to the second inlet and the first inlet is shut off.

9. The hydrostatic drive as claimed in claim 8, wherein the hydraulic regulating device is a load-sensing regulating valve which is acted upon by the pump pressure, with the effect of a pressure medium inflow to the actuating pressure chamber of the adjustment device, and is acted upon by a spring and a load sensing (LS) pressure, which is present at a load sensing (LS) connection of the hydraulic regulating device, with the effect of a pressure medium outflow from the actuating pressure chamber.

10. The hydrostatic drive as claimed in claim 9, wherein an adjustable pressure limiting valve is connected to the LS connection between the latter and a nozzle.

11. The hydrostatic drive as claimed in claim 9, wherein:
    in the mode as a pump, apart from the high pressure accumulator at least one further hydraulic consumer is suppliable with pressure medium by the hydraulic machine,
    the hydraulic machine operated as a pump is regulable depending on a highest load pressure of the at least one consumer, said load pressure being present in a common load sensing (LS) indicator line, for which purpose the LS indicator line is connected to the LS connection, and
    the pump line is also connectable to the LS indicator line or directly to the LS connection via a load sensing (LS) valve.

12. The hydrostatic drive as claimed in claim 11, wherein the LS valve is a switching valve which, in a basic position pretensioned by a spring, shuts off the pump line to the LS indicator line or to the LS connection, and which, in a switching position, connects the pump line to the LS indicator line or to the LS connection.

13. The hydrostatic drive as claimed in claim 11, wherein a first shuttle valve is arranged in the LS indicator line, at the first inlet of which shuttle valve the highest load pressure of the at least one consumer is present, and to the second inlet of which shuttle valve the LS valve is connected.

* * * * *